United States Patent
Choi et al.

(10) Patent No.: US 9,490,963 B2
(45) Date of Patent: Nov. 8, 2016

(54) SIGNAL CANCELLATION USING FEEDFORWARD AND FEEDBACK PATHS

(71) Applicant: Kumu Networks, Inc., Santa Clara, CA (US)

(72) Inventors: Jung-il Choi, Sunnyvale, CA (US); Steven Hong, Sunnyvale, CA (US); Mayank Jain, Sunnyvale, CA (US); Sachin Katti, Stanford, CA (US); Philip Levis, San Francisco, CA (US); Jeff Mehlman, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 373 days.

(21) Appl. No.: 14/172,805

(22) Filed: Feb. 4, 2014

(65) Prior Publication Data

US 2014/0219139 A1    Aug. 7, 2014

Related U.S. Application Data (60) Provisional application No. 61/760,518, filed on Feb. 4, 2013, provisional application No. 61/876,663, filed on Sep. 11, 2013.

(51) Int. Cl.
*H04L 5/14* (2006.01)
*H04L 1/00* (2006.01)
*H04B 1/525* (2015.01)

(52) U.S. Cl.
CPC ............. *H04L 5/1461* (2013.01); *H04B 1/525* (2013.01); *H04L 1/0036* (2013.01)

(58) Field of Classification Search
CPC .... H04B 1/525; H04L 5/1461; H04L 1/0036
See application file for complete search history.

(56) References Cited

U.S. PATENT DOCUMENTS

| 3,922,617 | A | 11/1975 | Denniston et al. |
| 4,321,624 | A | 3/1982 | Gibson et al. |
| 5,818,385 | A | 10/1998 | Bartholomew |
| 6,240,150 | B1 | 5/2001 | Darveau et al. |

(Continued)

FOREIGN PATENT DOCUMENTS

| EP | 0755141 A2 | 1/1997 |
| EP | 0755141 B1 | 10/2005 |

(Continued)

OTHER PUBLICATIONS

International Search Report and Written Opinion for PCT Application No. PCT/US2012/023184 mailed May 17, 2012.

(Continued)

*Primary Examiner* — Kenneth Lam
(74) *Attorney, Agent, or Firm* — Jeffrey Schox; Thomas Gwinn (57) ABSTRACT

A circuit that cancels a self-interference signal includes, in part, a pair of signal paths that are substantially in phase, each of which paths includes a passive coupler, a delay element and a variable attenuator. The circuit further includes, in part, a first group of P signal paths each of which is substantially in phase with the pair of paths, a second group of M signal paths each of which is substantially out-of-phase relative to the pair of signal paths, and at least a pair of feedback paths. Each of the P and M signal paths, as well as the feedback paths includes a delay element and a variable attenuator. Optionally, each of the M signal paths is optionally 180° out-of-phase relative to the pair of signal paths.

30 Claims, 7 Drawing Sheets

(56) References Cited

U.S. PATENT DOCUMENTS

| | | |
|---|---|---|
| 6,539,204 B1 | 3/2003 | Marsh et al. |
| 6,657,950 B1 | 12/2003 | Jones et al. |
| 7,336,940 B2 | 2/2008 | Smithson |
| 7,509,100 B2 | 3/2009 | Toncich |
| 8,027,642 B2 | 9/2011 | Proctor et al. |
| 8,179,990 B2 | 5/2012 | Orlik et al. |
| 8,351,533 B2 | 1/2013 | Shrivastava et al. |
| 8,422,540 B1* | 4/2013 | Negus .................. H04B 1/38 370/210 |
| 9,019,849 B2* | 4/2015 | Hui ............................ 370/252 |
| 9,312,895 B1 | 4/2016 | Gupta et al. |
| 2002/0034191 A1 | 3/2002 | Shattil |
| 2002/0172265 A1 | 11/2002 | Kenney |
| 2003/0104787 A1 | 6/2003 | Blount et al. |
| 2004/0106381 A1 | 6/2004 | Tiller |
| 2004/0266378 A1 | 12/2004 | Fukamachi et al. |
| 2005/0250466 A1 | 11/2005 | Varma et al. |
| 2005/0254555 A1 | 11/2005 | Teague |
| 2006/0030277 A1 | 2/2006 | Cyr et al. |
| 2006/0058022 A1 | 3/2006 | Webster et al. |
| 2006/0209754 A1 | 9/2006 | Ji et al. |
| 2006/0273853 A1* | 12/2006 | Suzuki ................ H03F 1/3229 330/151 |
| 2008/0107046 A1 | 5/2008 | Kangasmaa et al. |
| 2008/0111754 A1 | 5/2008 | Osterhues et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0180404 A1 | 7/2009 | Jung et al. |
| 2010/0022201 A1 | 1/2010 | Vandenameele |
| 2010/0136900 A1 | 6/2010 | Seki |
| 2010/0150033 A1 | 6/2010 | Zinser et al. |
| 2010/0232324 A1 | 9/2010 | Radunovic et al. |
| 2010/0279602 A1 | 11/2010 | Larsson et al. |
| 2011/0081880 A1 | 4/2011 | Ahn |
| 2011/0222631 A1 | 9/2011 | Jong |
| 2011/0250858 A1 | 10/2011 | Jain et al. |
| 2011/0311067 A1 | 12/2011 | Harris et al. |
| 2011/0319044 A1 | 12/2011 | Bornazyan |
| 2012/0063369 A1 | 3/2012 | Lin et al. |
| 2012/0063373 A1 | 3/2012 | Chincholi et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1* | 8/2012 | Jain ..................... H04B 1/525 370/277 |
| 2012/0224497 A1 | 9/2012 | Lindoff et al. |
| 2013/0005284 A1 | 1/2013 | Dalipi |
| 2013/0259343 A1 | 10/2013 | Liu et al. |
| 2013/0301488 A1* | 11/2013 | Hong ..................... H04B 1/56 370/278 |
| 2013/0308717 A1 | 11/2013 | Maltsev et al. |
| 2014/0011461 A1 | 1/2014 | Bakalski et al. |
| 2014/0169236 A1 | 6/2014 | Choi et al. |
| 2014/0185533 A1 | 7/2014 | Haub |
| 2014/0219449 A1* | 8/2014 | Shattil .................. H04W 12/08 380/270 |
| 2014/0348018 A1* | 11/2014 | Bharadia .............. H04L 5/1461 370/252 |
| 2014/0348032 A1* | 11/2014 | Hua ....................... H04B 1/44 370/277 |
| 2014/0376416 A1 | 12/2014 | Choi |
| 2015/0249444 A1 | 9/2015 | Shin et al. |
| 2015/0303984 A1* | 10/2015 | Braithwaite ........... H04B 1/525 455/78 |

FOREIGN PATENT DOCUMENTS

| | | |
|---|---|---|
| EP | 2267946 B1 | 12/2010 |
| WO | 2013173250 A1 | 11/2013 |
| WO | 2014/093916 A1 | 6/2014 |

OTHER PUBLICATIONS

International Search Report and Written Opinion for PCT Application No. PCT/US2012/023183 mailed May 17, 2012.
International Preliminary Report on Patentability for PCT Application No. PCT/US2012/023183 issued Aug. 6, 2013.
International Preliminary Report on Patentability for PCT Application No. PCT/US2012/023184 issued Aug. 6, 2013.
International Search Report and Written Opinion for PCT Application No. PCT/US2013/075166 mailed Apr. 22, 2014.
International Search Report and Written Opinion for PCT Application No. PCT/US2014/014726 mailed Jun. 2, 2014.
Non-Final Office Action for U.S. Appl. No. 13/293,072 mailed Jul. 19, 2013.
Final Office Action for U.S. Appl. No. 13/293,072 mailed Mar. 31, 2014.
Non-Final Office Action for U.S. Appl. No. 13/293,069 mailed Jul. 17, 2013.
Non-Final Office Action for U.S. Appl. No. 13/293,069 mailed May 1, 2014.

* cited by examiner

SIGNAL CANCELLATION USING FEEDFORWARD AND FEEDBACK PATHS

CROSS-REFERENCES TO RELATED APPLICATIONS

The present application claims priority to U.S. Application No. 61/760,518, entitled "Signal Cancellation Using FeedForward and FeedBack", filed Feb. 4, 2013, and U.S. Application No. 61/876,663, entitled "Cancellation Circuit With Variable Delay And Amplifier", filed Sep. 11, 2013, the contents of which applications are incorporated herein by reference in their entirety.

The present application is related to U.S. application Ser. No. 14/106,664, entitled "Feed Forward Signal Cancellation", filed Dec. 13, 2013, and U.S. application Ser. No. 14/158,711, entitled "Tuning Algorithm For Multi-Tap Signal Cancellation Circuit", filed Jan. 17, 2014, the contents of which applications are incorporated herein by reference in their entirety.

FIELD OF THE INVENTION

The present invention relates to wireless communication, and more particularly to a full duplex wireless communication system.

BACKGROUND OF THE INVENTION

A wireless system often operates in a half-duplex mode to either transmit or receive data at any given time. A device operating in a full-duplex mode may simultaneously transmit and receive data. However, the simultaneous transmission and reception of data are carried out over different frequencies. For example, a full-duplex cell phone uses a first frequency for transmission and a second frequency for reception. As is well known, using the same frequency for simultaneous transmission and reception in a conventional wireless system results in significant amount of self-interference at the receiver thereby rendering the system ineffective in receiving the desired signal.

BRIEF SUMMARY OF THE INVENTION

A circuit, in accordance with one embodiment of the present invention, includes, in part, a first signal path, a second signal path, a first group of P signal paths, a second group of M signal paths, and at least first and second feedback paths The first signal path includes, in part, a passive coupler, a delay element and a variable attenuator. The second signal path includes, in part, a passive coupler, a delay element and a variable attenuator. The second signal path is substantially in phase with the first signal path. The first group of P signal paths are substantially in phase with the first and second signal paths. Each of the first group of P signal paths includes, in part, a delay element and a variable attenuator. P−1 signal paths of the first group of P signal paths include a passive coupler. The second group of M signal paths each are substantially out-of-phase relative to the first and second signal paths. Each of the second M signal paths includes, in part, a delay element and a variable attenuator. M−1 signal paths of the second group of M signal paths include a passive coupler. Each of M and P is an integer equal to or greater than one. The first feedback path is formed via the isolation port of the passive coupler disposed in the first signal path, or the isolation port of the passive coupler disposed in one of the first P signal paths.

The second feedback path is formed via the isolation port of the passive coupler disposed in the second signal path, or the isolation port of the passive coupler disposed in one of the second M signal paths. Each of the first and second feedback paths includes, in part, a delay element and a variable attenuator. The feedback paths form additional tuning paths used to form an IIR filter.

In one embodiment, the circuit further includes, in part, at least one antenna for receiving or transmitting a signal. In one embodiment, each of the first signal path, the second signal path, the first group of P signal paths and the second group of M signal paths is adapted to receive a sample of a transmit signal and generate a delayed and weighted sample of the transmit signal. In one embodiment, the circuit further includes, in part, a control block adapted to vary an attenuation level of the variable attenuators disposed in the first signal path, the second signal path, the first group of P signal paths, the second group of M signal paths, and the first and second feedback paths. The circuit further includes, in part, a combiner adapted to combine the delayed and weighted samples of the transmit signal to generate a first signal representative of a self-interference signal. The circuit further includes, in part, a combiner/coupler adapted to subtract the first signal from the received signal.

In one embodiment, the delay element disposed in the first signal path generates a delay shorter than the arrival time of a second sample of the transmit signal at the combiner/coupler, and the delay element disposed in the second signal path generates a delay longer than the arrival time of the second sample of the transmit signal at the combiner/coupler. In one embodiment, the first signal path, the second signal path, the first group of P signal paths and the second group of M signal paths form P/2+M/2+1 associated pairs of paths. The delays generated by the delay elements of each such associated pair of delay paths form a window within which the second sample of the transmit signal arrives at the combiner/coupler.

In one embodiment, the circuit further includes, in part, a controller adapted to determine the attenuation levels of the variable attenuators disposed in the first signal path, the second signal path, the first P signal paths, the second M signal paths in accordance with values of intersections of an estimate of the self-interference signal and P+M+2 sinc functions centered at boundaries of the P/2+M/2+1 windows. In one embodiment, a peak value of at least a subset of the P+M+2 sinc functions is set substantially equal to an amplitude of the estimate of the self-interference signal. In one embodiment, the circuit further includes, in part, a splitter adapted to generate the sample of the transmit signal from the transmit signal. In one embodiment, the circuit further includes, in part, an isolator having a first port coupled to the antenna, a second port coupled to a transmit line of the circuit, and a third port coupled to a receive line of the circuit. In one embodiment, the isolator is a circulator.

A method of reducing the self-interference signal in a communication system, in accordance with one embodiment of the present invention includes, in part, delivering a first portion of a first sample of a transmit signal to a first passive coupler to generate a first signal portion, generating a first signal defined by a delayed and weighted sample of the first signal portion, delivering a second portion of the sample of the transmit signal to a second passive coupler to generate a second signal portion, generating a second signal defined by a delayed and weighted sample of the second signal portion, generating a first group P signals each being substantially in phase with the first and second signals and each defined by a different delayed and weighted sample of either the first signal portion or the second signal portion, generating a second group of M signals each being substantially out-of-phase relative to the first and second signals and each defined by a different delayed and weighted sample of either the first signal portion or the second signal portion, generating at least a first feedback signal using the first signal or a first one of the first P signal paths, generating at least a second feedback signal using the second signal or a first one of the M signals and combining the first signal, the second signal, the first group of P signals, the second group of M signals, and the first and second feedback signals to generate a combined signal representative of the self-interference signal. At least one of the P signals and/or one of the M signals is a feedback signal. The feedback paths form additional tuning paths to form an IIR filter.

The method, in accordance with one embodiment of the present invention, further includes, in part, receiving a second sample of the transmit signal via an antenna, and combining/coupling the combined signal with the second sample of the transmit signal received via the antenna. In one embodiment, the method further includes, in part, setting the delay of the first signal to a value less than the arrival time of the second sample of transmit signal at the antenna, and setting the delay of the second signal to a value greater than the arrival time of the second sample of the transmit signal at the antenna.

In one embodiment, the method further includes, in part, forming P/2+M/2+1 associated time windows defined by the delays of the first signal, the second signal, the first group of P signals, and the second group of M signals, and selecting the delays of the first signal, the second signal, the first group of P signals, and the second group of M signals such that the arrival time of the second sample of the transmit signal at the antenna falls within each of the P/2+M/2+1 time windows. The method further includes, in part, determining the weights of the first signal portion and the second signal portion in accordance with values of intersections of an estimate of the self-interference signal and P+M+2 sinc functions centered at boundaries of the P/2+M/2+1 time windows.

In one embodiment, the method further includes, in part, setting a peak value of at least a subset of the P+M+2 sinc functions substantially equal to an amplitude of the estimate of the self-interference signal. In one embodiment, the method further includes, in part, receiving the first sample of the transmit signal from a splitter. In one embodiment, the method further includes, in part, delivering a second portion of the transmit signal to an isolator, and delivering the transmit signal from the isolator to the antenna. In one embodiment, the isolator is a circulator.

A signal cancellation circuit, in accordance with one embodiment of the present invention, includes, in part, N signal paths each of which is either in-phase or 180° out-of-phase relative to other (N−1) signal paths. Each of at least a subset of the N signal paths includes, a passive coupler, a delay element and a variable attenuator, wherein N is an integer greater than one.

DETAILED DESCRIPTION OF THE INVENTION

Figure 1:
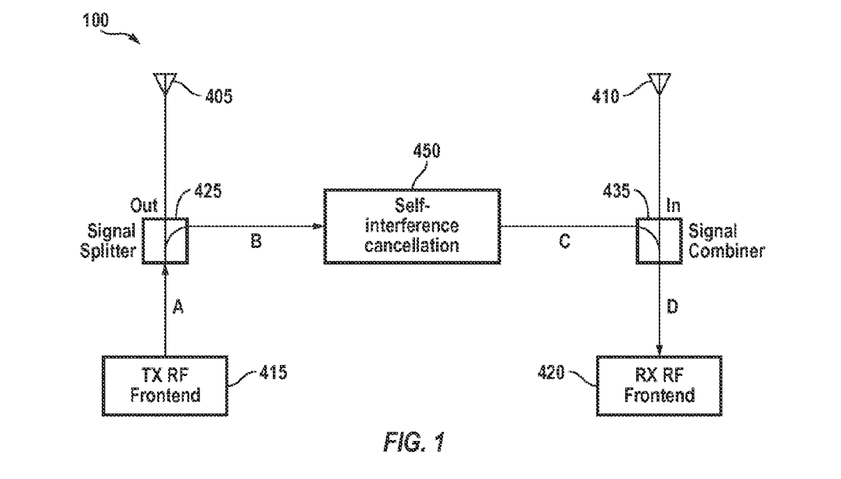
FIG. 1 is a simplified block diagram of a full-duplex wireless communication system, in accordance with one embodiment of the present invention.

FIG. 1 is a simplified block diagram of a full-duplex wireless communication device 100, in accordance with one embodiment of the present invention. Wireless communication device 100, which may be a cellular phone, a base station, an access point or the like, is configured to transmit data/signals via transmit antenna 405 and receive data/signals via a receive antenna 410. Wireless communication device (herein alternatively referred to as device) 100 is also shown, as including, in part, a transmit front-end 415, a signal splitter 425, a receive front end 420, a signal combiner 435, and a self-interference cancellation circuit 450. Device 100 may be compatible and operate in conformity with one or more communication standards such as WiFi™, Bluetooth®, GSM EDGE Radio Access Network ("GERAN"), Universal Terrestrial Radio Access Network ("UTRAN"), Evolved Universal Terrestrial Radio Access Network ("E-UTRAN"), Long-Term Evolution (LTE), and the like.

Transmit front-end 415 is adapted to process and generate transmit signal A. Signal splitter 425 splits the transmit signal and delivers a portion (sample) of this signal, i.e., signal B, to self-interference cancellation circuit 450. The remaining portion of the transmit signal, which is relatively large (e.g., 85% of the transmit signal) is delivered to transmit antenna 405. Because the transmit and receive antenna 405 and 410 operate in substantially the same frequency band, signal IN received by receive antenna 410 includes the desired signal as well as a portion of the transmitted signal OUT. The transmitted signal component that is received by antenna 410 is an undesirable signal and is referred to hereinafter as the self-interference signal. Self-interference cancellation circuit 450 operates to reconstruct the self-interference signal—which is subsequently subtracted from the received signal IN. To achieve this, self-interference cancellation circuit 450 generates a multitude of weighted and delayed samples of the transmit signal, and combine these signals to generate signal C that is representative of the self-interference signal. Signal combiner 435 is adapted to subtract the signal it receives from self-interference cancellation circuit 450 from the signal it receives from antenna 410, thereby to deliver the resulting signal D to receive front-end 420. Accordingly, the self-interference component of the signal received by receive front-end 420 is substantially degraded. In one embodiment, self-cancellation circuit 450 may cancel, e.g., 20-25 dB of self-interference signal.

Figure 2:
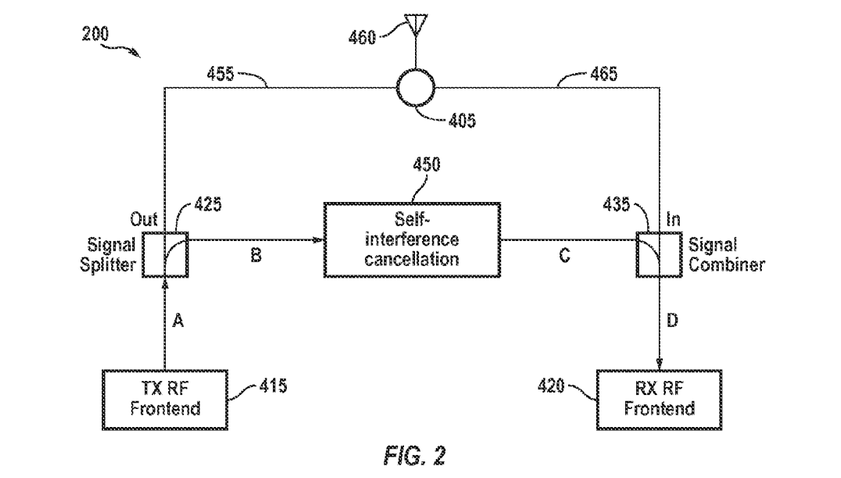
FIG. 2 is a simplified block diagram of a full-duplex wireless communication system, in accordance with one embodiment of the present invention.

FIG. 2 is a simplified block diagram of a full-duplex wireless communication device (hereinafter alternatively referred to as device) 200, in accordance with another embodiment of the present invention. Device 200 is similar to device 100 except that device 200 has a single antenna 460 used for both transmission and reception of signals. Device 200 also includes a circulator 405 that provides isolation between its ports. Circulator 405 is adapted to concurrently deliver the transmit signal and the receive signal to and from antenna 460. In one exemplary embodiment, circulator 405 provides approximately 15 dB of isolation between the transmit and receive paths, thereby reducing the self-interference on the receive port by approximately 15 dB.

Figure 3:
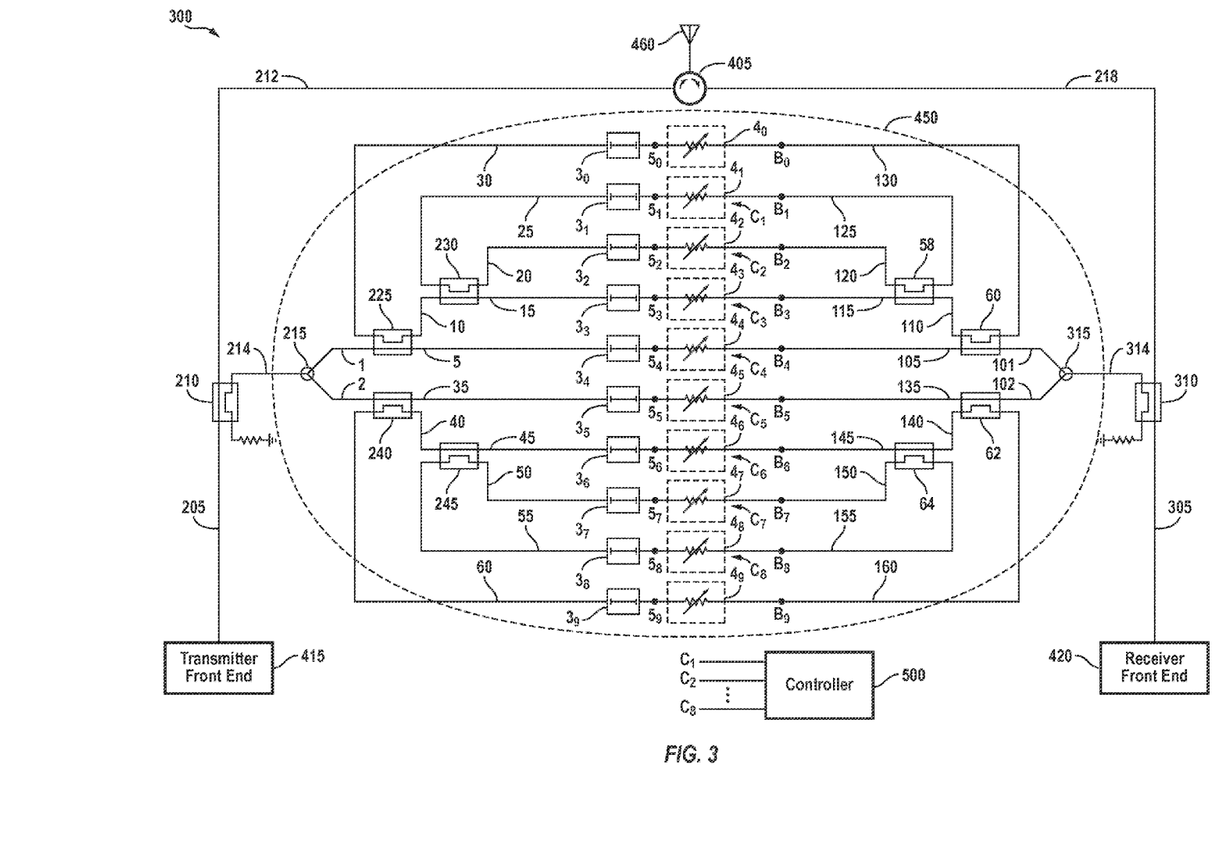
FIG. 3 is a simplified block diagram of a full-duplex wireless communication system, in accordance with one embodiment of the present invention.

FIG. 3 is a simplified block diagram of a full-duplex wireless communication device (hereinafter alternatively referred to as device) 300, in accordance with one exemplary embodiment of the present invention. Device 300 is shown as including, in part, a transmitter front end 415, a receiver front end 420, a transmit/receive antenna 460, a circulator 405, and a self-interference cancellation circuit 450 as is also disposed in devices 100 and 200 shown in FIGS. 1 and 2 respectively. Coupler 210 receives a sample of transmit signal 205 and in response delivers a through signal 212 to circulator 450, and a coupled signal 214 to splitter 215. Self-interference signal cancellation circuit 450 is adapted to reconstruct the self-interference signal 314 from the sample of the transmit signal 214. The reconstructed self-interference signal 314 is subtracted from received signal 218 by coupler 310 thereby to recover the signal of interest 305, also referred to as the desired signal. The desired signal 305 is delivered to receiver front end 420 for further processing.

In the following, for simplicity, the same reference number may be used to identify both the path through which a signal travels, as well as to the signal which travels through that path. For example, reference numeral 5 may be used to refer to the path so identified in FIG. 3, or alternatively to the signal that travels through this path. Furthermore, in the following, the terms divider, splitter, coupler, or combiner are alternatively used to refer to an element adapted to split/divide a signal to generate more signals and/or couple/combine a multitude of signals to generate one or more signals. Such a component is also alternatively referred to herein as splitter/coupler.

Exemplary self-interference signal cancellation circuit 450 is shown as having 10 signal paths (also referred to herein as taps), namely signal paths 30, 25, 20, 15, 5, 35, 45, 50, 55, 60. It is understood, however, that a self-interference signal cancellation circuit, in accordance with the present invention, may have fewer or more than 10 taps and thus may have any number of even or odd taps. Signal paths 20, 15, 5, 35, 45, 55 are feedforward paths, and signal paths 30, 25, 55, 60 are feedback paths, as described further below. Signal cancellation circuit 450 is adapted to enable full duplex wireless communication by cancelling or minimizing the self-interference signal. As seen from FIG. 3, each tap includes a delay element and a variable attenuator to compensate for a range of disturbances, such as variable delay spreads.

As described above, coupler 210 receives a sample of transmit signal 205 and in response delivers a through signal 212 to circulator 405, and a coupled signal 214 to splitter 215. Signal 214 may be, for example, 10-20 dB weaker than signal 205. Splitter 215 is adapted to split signal 214 into two signals 1, and 2, which may have equal powers in one embodiment. The through and coupled output signals 212 and 214 of coupler 210 are respectively in phase and 90° out of phase with respect to signal 205.

Signal 1 is applied to coupler 225, which in response generates a through output signal 5 and a coupled output signal 10. Similarly, signal 10 is applied to coupler 230, which in response generates a through output signal 15 and a coupled output signal 20. The coupled output signal of each of couplers 225, and 230 has a 90° phase shift relative to its through output signal. Accordingly, signals 5 and 10 have a 90° phase difference. Likewise, there is a 90° phase difference between signals 15 and 20.

In a similar manner and as shown, Signal 2 is applied to coupler 240, which in response generates a through output signal 35 and a coupled output signal 40. Signal 40 is applied to coupler 245, which in response generates a through output signal 45 and a coupled output signal 50. The coupled output signal of each of couplers 240, and 245 has a 90° phase shift relative to its through output signal. Accordingly, signals 35 and 40 have a 90° phase difference. Likewise, there is a 90° phase difference between signals 45 and 50.

The coupled output of each coupler is weaker than the signal received by that coupler by a predefined dB. In one example, the coupled output of each coupler is 6 dB weaker than the signal received by that coupler. As is well known, the through output signal of each coupler is also weaker than the coupler's input signal due to an insertion loss. However, for each coupler, the through output signal is stronger than the coupled output signal. Accordingly, in the exemplary embodiment shown in FIG. 3, signals 5, 35 have substantially the same phase and power and are the strongest signals; signals 15, 45 have substantially the same phase and power and are the second strongest signals; and signals 20, 50 have substantially the same phase and power and are the third strongest signals.

Self-interference signal cancellation circuit 450 is further shown as including ten delay elements $3_0, 3_1, 3_2, 3_3, 3_4, 3_5, 3_6, 3_7, 3_8$ each adapted to delay the signal it receives by a fixed or variable amount of delay. Delay elements $3_0, 3_1, 3_2, 3_3, 3_4, 3_5, 3_6, 3_7, 3_8, 3_9$ are adapted respectively to delay signals 30, 25, 20, 15, 5, 35, 45, 50, 55, 60 by different amounts of delay. For example, in the exemplary embodiment shown in FIG. 1, delay elements $3_2, 3_3, 3_4, 3_5, 3_6, 3_7$, disposed in the feedforward paths are adapted to delay the signals they receive respectively by D, 2D, 3D, 4D, 5D, and 6D, where D is a fixed amount. In other embodiments, the delay elements may delay the signals they receive by different amounts or ratios.

Self-interference signal cancellation circuit 450 is further shown as including ten variable attenuators $4_0$, $4_1$, $4_2$, $4_3$, $4_4$, $4_5$, $4_6$, $4_7$, $4_8$, $4_9$ each adapted to attenuate the signal it receives from its associated delay element in accordance with a different attenuation signal $C_i$, wherein i is an integer ranging from 0 to 9 in this exemplary embodiment, generated by controller 500. Accordingly, signals 120, 115, 105, 135, 145, 150, supplied respectively by variable attenuators $4_2$, $4_3$, $4_4$, $4_5$, $4_6$, $4_7$, (alternatively and collectively referred to herein using reference number 4) are time-delayed, weighted signal samples that are used to reconstruct the self-interference component of the transmitted signal at the receiver using a sinc function and in conformity with the sampling theory, as described further below.

In accordance with one embodiment, the control signals $C_i$ applied to variable attenuators $4_2$, $4_3$, $4_4$, $4_5$, $4_6$, $4_7$ disposed in the feedforward paths are selected such that the weights associated with and assigned to the two center taps $5_4$, $5_5$ have first and second highest magnitudes, the weights associated with adjacent taps $5_3$, $5_6$ have third and fourth highest magnitudes, and the weights associated with taps $5_2$, $5_7$ have fifth and sixth highest magnitudes. Consequently, in accordance with such embodiments, by disposing a variable attenuator in each feedforward path and aggregating their responses, the phase offset and the variable delay spread caused by any perturbation of the transmitted signal as it arrives at the receiver may be accounted for. An algorithm, such as the gradient decent algorithm, may be used to set the attenuation level of each of the variable attenuators $4_2$, $4_3$, $4_4$, $4_5$, $4_6$, $4_7$, disposed in different feedforward paths via control signals $C_i$.

As seen from FIG. 3, coupler 58 couples signals 115 and 120 to generate signal 110; and coupler 60 couples signals 105 and 110 to generate signal 101. Likewise, coupler 64 couples signals 145 and 150 to generate signal 140; and coupler 62 couples signals 135 and 140 to generate signal 102. Signal combiner 315 is adapted to combine signals 101, 102 to reconstruct the self-interference signal 314.

The output signal of each of couplers 58, 60, 62, and 64, has a 90° phase difference relative to its coupled input signal and a 0° phase difference relative to its through input signal. Accordingly, for example, the signal travelling from path 1 to path 101 via paths 5, 105 does not experience a relative phase shift. However, the signal travelling from path 1 to path 101 via paths 10, 15, 115, 110 receives a first 90° phase shift while passing through coupler 225, and a second a 90° phase shift while passing through coupler 60. Therefore, path 1, 10, 15, 115, 110, 101 has a 180° phase shift relative to path 1, 5, 105, 101.

Likewise, the signal travelling from path 1 to path 101 via paths 10, 20, 120, 110, 101 receives a first 90° phase shift while passing through coupler 225, a second 90° phase shift while passing through coupler 230, a third 90° phase shift while passing through coupler 58, and a fourth a 90° phase shift while passing through coupler 60. In other words, the path defined by paths (alternatively and for simplicity referred to as path) 1, 10, 20, 120, 110 has a 360° phase shift relative to and is thus in phase with path 1, 5, 105, 101.

Similarly, path 2, 40, 45, 145, 140, 102, has a 180° phase shift relative to path 2, 35, 135, and 102. Path 2, 40, 50, 150, 140, 102, has a 360° phase shift relative to and is thus in phase with path 2, 35, 135, and 102.

Since path 1, 5, 105, 101 is in phase with path 2, 35, 135, 102, taps $5_4$, $5_5$—associated with attenuator $4_4$, $4_5$—are in phase. For the reasons described above, each of taps $5_3$, $5_6$—associated with attenuators $4_3$, $4_6$—has a 180° phase shift relative to taps $5_4$, $5_5$; and each of taps $5_2$, $5_7$—associated with attenuators $4_2$, $4_7$—is in phase with taps $5_4$, $5_5$. Consequently, taps $5_7$, $5_6$, $5_3$, $5_2$, in accordance with embodiments of the present invention, are selected so as be either in-phase or 180° out-of-phase relative to the center taps $5_4$, $5_5$ in an alternating manner.

The polarities resulting from the selected tap phases together with the attenuation weights supplied by the variable attenuators enable the construction of the self-interference signal 314 at the output of signal combiner 315. Coupler 310 receives the coupled input signal 314 and the through input signal 218 and in response supplies signal 305. Signal 305 is thus in phase with signal 218 but 90° out-of-phase relative to signal 314. Accordingly, the signal travelling through the path 205, 214, 314 experiences a 180° phase shift relative to the self-interference signal travelling through the path 205, 212, 218. Couplers 210, 310 thus together provide the polarity and sign reversal required to subtract the reconstructed self-interference signal 314 from signal 218 and deliver to receiver 420 signal 305 which has a substantially degraded/cancelled component of the transmitted signal.

As shown, self-interference cancellation circuit 450 receives a sample 214 of the transmit signal 205 via splitter 210. As described above, each path in self-interference cancellation circuit 450 is shown as including a delay element $3_i$ where i is an index varying from 1 to 10 in this exemplary embodiment, and a variable attenuator $4_i$. The level of attenuation of each variable attenuator $4_i$ may be varied in accordance with a predefined algorithm implemented by controller 500. Each delay element $3_i$ is adapted to generate a signal that is a delayed version of signal 214. Each variable attenuator $4_i$ is adapted to attenuate the amplitude of the signal it receives in accordance with the control signal $C_i$ applied thereto by controller 500 so as to generate an attenuated (weighted) signal $B_i$. Signals $B_2$, $B_3$, $B_4$, $B_5$, $B_6$ and $B_7$ are different delayed and weighted versions of signal 214. The output of combiner 315 is signal 314 and is representative of the self-interference component of the transmit signal. In one embodiment combiner 315 is an adder adding signals 101, 102 to generate signal 314. In other embodiments, combiner 315 may perform other arithmetic or logic functions generate signal 314.

Self-interference signal cancellation circuit 450 is further shown as including, in part, four feedback paths each formed by coupling the isolation port of a coupler disposed on the input sides of the delay elements (the transmitting end of cancellation circuit 450) to the isolation port of an associated coupler disposed on the output sides of the delay elements (the receiving end of the cancellation circuit 450). For example, the isolation port of coupler 60 is coupled—via attenuator $4_0$ and delay element $3_0$—to the isolation port of its associated coupler 225. Likewise, the isolation port of coupler 58 is coupled to the isolation port of its associated coupler 230 via attenuator $4_1$ and delay element $5_1$; the isolation port of coupler 62 is coupled to the isolation port of its associated coupler 240 via attenuator $4_9$ and delay element $5_9$; and the isolation port of coupler 64 is coupled to the isolation port of its associated coupler 245 via attenuator $4_8$ and delay element $5_8$. Accordingly, exemplary Self-interference signal cancellation circuit 450 is shown as including four such feedback paths.

As is seen from FIG. 3, each feedback path includes, in part, a variable attenuator and a delay element. The feedback path formed by paths 30 and 130 includes delay element $3_0$ and variable attenuator $4_0$; the feedback path formed by paths 25 and 125 includes delay element $3_1$ and variable attenuator $4_1$; the feedback path formed by paths 55 and 155 includes delay element $3_8$ and variable attenuator $4_8$; and the feedback path formed by paths 60 and 160 includes delay element $3_9$ and variable attenuator $4_9$. Each of the variable attenuators $4_0$, $4_1$, $4_8$ and $4_9$ disposed in the feedback paths is adapted to attenuate the signal it receives from the isolation port of its associated coupler via an associated delay element. Accordingly, each of variable attenuators $4_0$, $4_1$, $4_8$ and $4_9$ attenuates the signal it receives from the isolation port of couplers 225, 230, 245, and 240, respectively, via delay elements $3_0$, $3_1$, $3_8$ and $3_9$. The output signals of the variable attenuators $4_0$, $4_1$, $4_8$, $4_9$ are respectively applied to the isolation ports of their associated couplers 60, 58, 64, and 62. Variable attenuators $4_0$, $4_1$, $4_8$, $4_9$ are controlled via controller 500 which, in one embodiment, implements a gradient descent algorithm to determine the values applied to the variable attenuators. In yet other embodiments, the signals applied to the variable attenuators are determined in accordance with the algorithm described in Application Ser. No. 61/754,447, the content of which is incorporated herein by reference in its entirety.

In accordance with the present invention, by feeding back the signals present at the isolation ports of the couplers disposed on the receiving side, namely couplers 58, 60, 62, 64 to the isolation ports of the couplers disposed on the transmitting side, namely couplers 230, 225, 240 and 245 a number of advantages are achieved. The signal energy that would have otherwise been wasted at the isolation ports of couplers 58, 60, 62, 64, 245, 240, 225, and 230, is instead used within the cancelation circuit 450, thereby reducing power consumption. Furthermore, the feedback paths formed by feeding back the signals supplied at the isolation ports of couplers 58, 60, 62, 64 to the isolation ports of couplers 230, 225, 240, 245 form infinite impulse response (IIR) filters thereby enabling implementation of more complex operations. One such IIR filter is defined by forward path 10, 15, 115, 110 and feedback path 160, 160B. Although not shown, it is understood that other IIR filters may be used in accordance with the present invention to form a signal cancelation circuit.

As described above, self-interference cancellation circuit 450 is operative to reconstruct the self-interference signal from the signal values present on the multiple paths disposed between splitter 215 and combiner 315. Since both the self-interference signal and the time-delayed, weighted signals $B_2$, $B_3$, $B_4$, $B_5$, $B_6$, $B_7$ are samples of the same transmit signal, the reconstruction of the self-interference signal is similar to band-limited interpolation. Furthermore, since only a finite number of taps are available, a windowed interpolation is used to reconstruct signal 314. Therefore, the signal representative of the self-interference signal, in accordance with one embodiment of the present invention, is generated from signals $B_2$, $B_3$, $B_4$, $B_5$, $B_6$, $B_7$ that are delayed and weighted versions of the same sampled transmit signal 214.

To generate a signal representative of the self-interference signal, in accordance with one exemplary embodiment, the delays generated in each pair of associated feedforward paths disposed between splitter 215 and combiner 315 are selected such that the arrival time of the self-interference signal at subtractor 314 falls within the difference between such two delays (also referred to herein as the delay window). Accordingly, the delay generated by a first tap in each such pair of associated feedforward taps is less than the arrival time of signal 218 at subtractor 114 (the arrival time is referred to herein as $T_{self\_int}$) and the delay generated by a second tap in each pair of associated feedforward taps is greater than $T_{self\_int}$.

Figure 4:
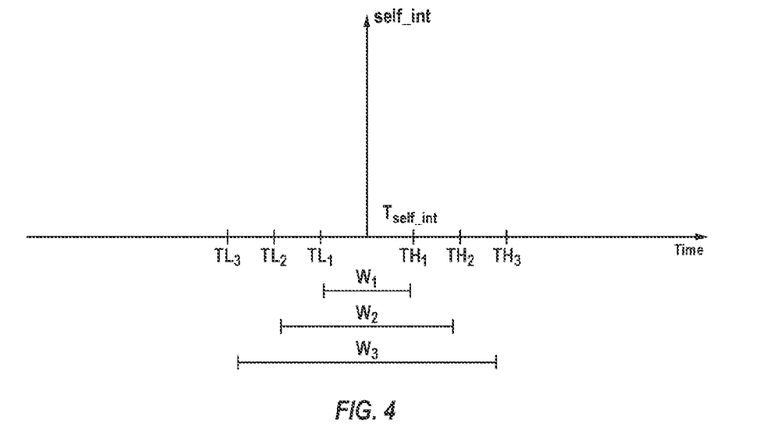
FIG. 4 shows first and second windows each defined by the delays of different pairs of associated paths of the self-interference cancellation circuit of FIG. 3, in accordance with one embodiment of the present invention.

In one embodiment, the center two taps, namely taps $5_4$ and $5_5$, form the first pair of associated taps such that, for example, the delay $TL_1$ generated by delay element $3_4$ is less than $T_{self\_int}$ and the delay $TH_1$ generated by delay element $3_5$ is greater than $T_{self\_int}$. $TL_1$ and $TH_1$ are thus selected to be the closest such delays to $T_{self\_int}$. The next two taps closest to the center taps, namely taps $5_3$ and $5_6$, form the second pair of associated taps such that, for example, the delay $TL_2$ generated by delay element $3_3$ is less than delay $TL_1$ and the delay $TH_2$ generated by delay element $3_6$ is greater than delay $TL_1$; therefore $TL_2$ and $TH_2$ are selected to be the second closest such delays to $T_{self\_int}$. The delays associated with the next pair of associated taps $5_2$, $5_7$ are selected such that, for example, the delay $TL_3$ generated by delay element $3_2$ is less than delay $TL_2$ and the delay $TH_3$ generated by delay element $3_6$ is greater than delay $TL_2$; therefore $TL_3$ and $TH_3$ are selected to be the third closest such delays to $T_{self\_int}$. FIG. 4 shows the relationship between these delays. It is understood that in other embodiments, associated feedforward taps may be arranged and selected differently. For example, in another embodiment, taps $5_5$ and $5_3$ may be selected as associated taps and used to form a delay window.

The following description is made with reference to an arrangement according to which the center feedforward taps $5_4$ and $5_5$ form the first pair of associated taps, feedforward taps $5_3$ and $5_6$ form the second pair of associated taps, and feedforward taps $5_2$ and $5_7$ form the third pair of associated taps. Furthermore, in the following, the delays and interpolations associated with only 2 pairs of associated taps, namely associated taps $5_4/5_5$ and associated taps $5_3/5_6$ are described. It is understood, however, that similar operations may be performed for all other taps regardless of the number of taps disposed in a self-interference cancellation circuit in accordance with the present invention.

As shown in FIG. 4, $TL_1$ represents the time around which signal $B_4$ is generated (the delays across attenuators $4_i$ are assumed to be negligible relative to the delays across delay elements $3_i$), $TH_1$ represents the time around which signal $B_5$ is generated, $TL_2$ represents the time around which signal $B_3$ is generated, and $TH_2$ represents the time around which signal $B_6$ is generated. As is seen, time delays $TH_1$ and $TL_1$ are selected—using delay elements $3_4$ and $3_5$—such that $T_{self\_int}$ falls within the window $W_1$ defined by the difference $TH_1-TL_1$. Likewise, time delays $TH_2$ and $TL_2$ are selected such that $T_{self\_int}$ falls within the window $W_2$ defined by the difference $TH_2-TL_2$; $TH_3$ and $TL_3$ are selected such that $T_{self\_int}$ falls within the window $W_3$ defined by the difference $TH_3-TL_3$ Accordingly, as described above and shown in FIG. 4, for each pair of associated feedforward taps defining a window, the amount of delay generated by one of the feedforward paths is longer than $T_{self\_int}$, and the amount of delay generated by the other one of the feedforward paths is shorter than $T_{self\_int}$. For example, referring to window $W_1$, $TH_1$ is greater than $T_{self\_int}$ and $TL_1$ is smaller than $T_{self\_int}$ is understood that the feedforward tap delays are selected such that $T_{self\_int}$ falls within a window defined by any pair of associated feedforward paths. Although the above description is provided with reference to a delay structure that includes an even number of taps, it is understood that the present invention equally applies to a delay structure with an odd number of taps. For example, a delay structure with an odd number of taps may be selected so as to position $T_{self\_int}$ within a time from the delay generated by the last delay path after all the other delay paths have been formed into associated pairs.

Figure 5:
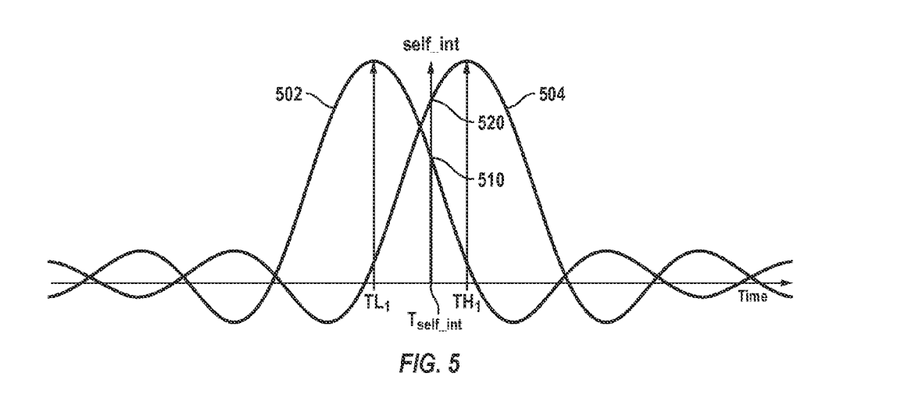
FIG. 5 shows the intersections between the self-interference signal and a pair of sinc functions centered at the boundaries of the first window of FIG. 4, in accordance with one embodiment of the present invention.
Figure 6:
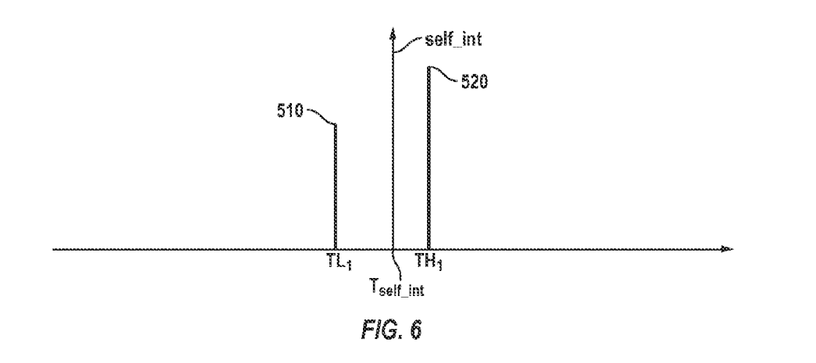
FIG. 6 shows the level of attenuations applied to the pair of signals travelling in the paths defining the first window shown in FIG. 5, in accordance with one embodiment of the present invention.

To determine the level of attenuation for each of the attenuators $4_2, 4_3, 4_4, 4_5, 4_6, 4_7$, disposed in the feedforward paths, in accordance with one exemplary embodiment of the present invention, sinc interpolation is used. It is understood however that any other interpolation scheme may also be used. To achieve this, for each window, the intersection of a pair of sinc functions—each centered at one of the window boundaries and each having a peak value substantially equal to an initially estimated peak value of the self-interference signal—and the interference signal is determined. For example, referring to FIG. 5, sinc function 502 centered at $TL_1$ is seen as intersecting the self-interference signal Self_int at point 510, and sinc function 504 centered at $TH_1$ is seen as intersecting the self-interference signal Self_int at point 520. The heights of points 510 and 520 define the level of attenuations applied to attenuators $4_4$ and $4_5$, respectively. FIG. 6 shows the attenuation levels 510, 520 so determined and applied to attenuators $4_4$ and $4_5$ respectively. Furthermore, since the amplitude and delay associated with the self-interference signal Self_int may not be known in advance, the attenuation value for each attenuator may be optimized using an iterative optimization scheme to converge to an operating point of minimum measured self-interference at the receiver.

Figure 7:
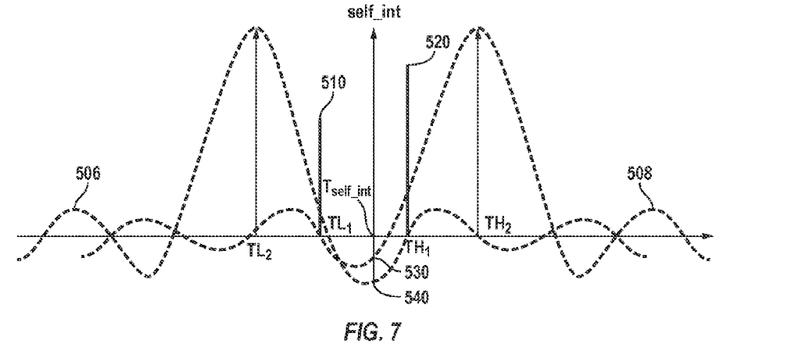
FIG. 7 shows the intersections between the self-interference signal and a pair of sinc functions centered at the boundaries of the second window of FIG. 4, in accordance with one embodiment of the present invention.
Figure 8:
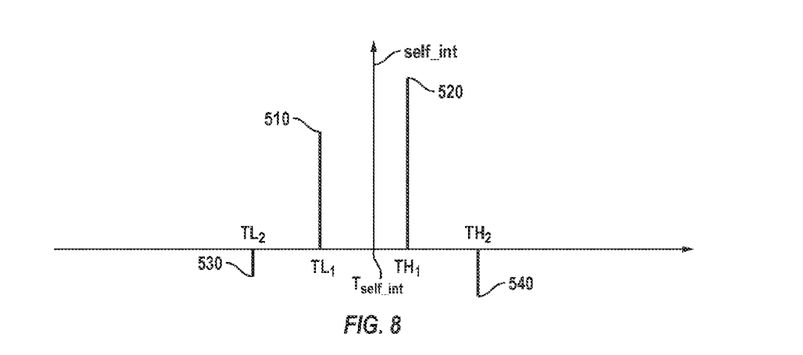
FIG. 8 shows the level of attenuations applied to the two pairs of signals travelling in the paths defining the first and second windows shown in FIG. 5, in accordance with one embodiment of the present invention.

FIG. 7 shows the intersection of sinc functions positioned at the window boundaries $TL_2$ and $TH_2$ with the self-interference signal Self_int. As is seen, sinc function 506 centered at $TL_2$ is seen as intersecting the self-interference signal at point 530, and sinc function 508 centered at $TH_2$ is seen as intersecting the self-interference signal Self_int at point 540. The heights of points 530 and 540 define the level of attenuations applied to attenuators $3_3$ and $3_4$, respectively. FIG. 8 shows the attenuation levels 510, 520, 530, 540 so determined and applied to attenuators $3_4, 3_5, 3_3,$ and $3_6$ respectively. As is seen in FIGS. 7 and 8, the attenuations levels applied to attenuators $3_4, 3_5$ have positive values (have a positive polarity), whereas the attenuations levels applied to attenuators $3_3, 3_6$ have negative values and thus have a negative polarity. It is understood that the attenuation levels for the remaining taps are similarly determined. Further details regarding the application of the sampling theory to reconstruct a sampled signal is provided in "Multirate Digital signal Processing" by Ronald E. Crochiere, and Lawrence R. Rabiner, Prentice-Hall Processing series, 1983, the content of which is incorporated herein by reference in its entirety.

The output signal 314 of combiner 315 represents a summation of signal $B_0, B_2 \ldots B_9$ and is representative of the self-interference signal. As the delay of the self-interference signal changes and its position within the windows moves, the intersections of the self-interference signal and the sinc functions change, thereby causing the attenuation levels to change, which in turn causes the reconstructed signal representative of the self-cancelation signal to also change and track the self-interference signal.

Figure 9:
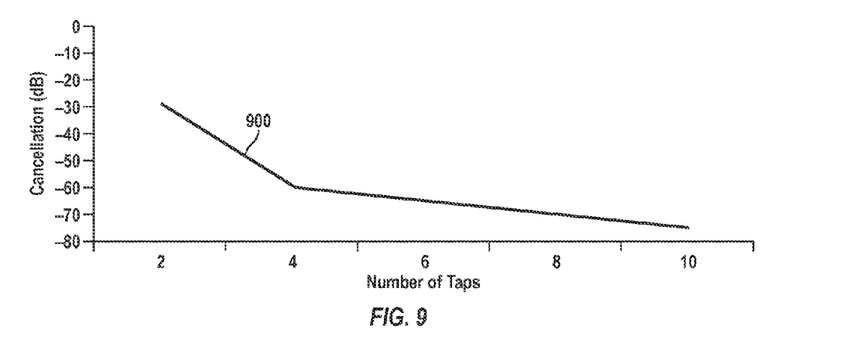
FIG. 9 is an exemplary plot showing the relationship between the number of delay/attenuation paths and the amount of cancellation, in accordance with one embodiment of the present invention.

The higher the number of taps, the greater is the amount of self-interference cancellation. FIG. 9 is an exemplary plot 900 of the amount of self-interference cancellation as a function of the number of taps. As is seen, the amount of self-interference cancellation for two taps and ten taps are respectively shown as being approximately −30 dB and −75 dB. In other words, by increasing the number of taps, self-interference cancellation on a wider bandwidth is achieved.

Figure 10:
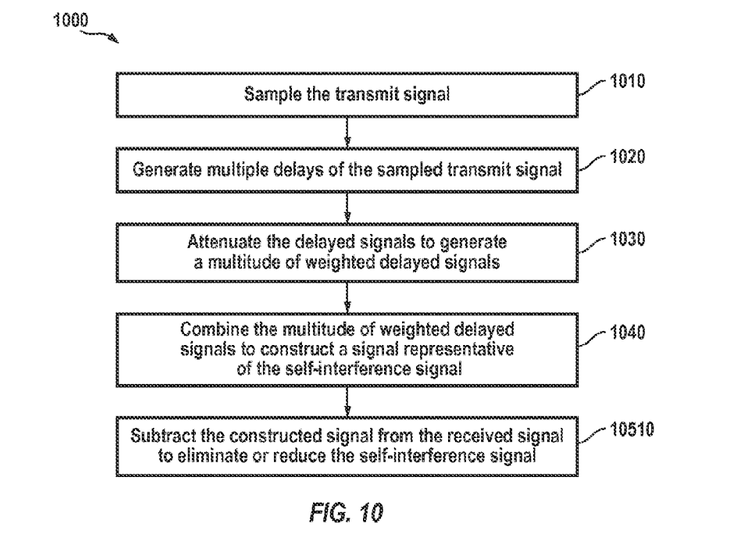
FIG. 10 is a flowchart for cancelling or reducing a self-interference signal, in accordance with one embodiment of the present invention.

FIG. 10 shows a flowchart 1000 for canceling or reducing the self-interference signal at a receiver of a communication device, in accordance with one embodiment of the present invention. To achieve this, the transmit signal is sampled 1010. Thereafter, a multitude of delayed version of the sampled transmit signal are generated 1020 using feedforward paths. Feedback paths are also formed, as described above, to save energy and form one or more IIR filters. The delayed versions of the sampled transmit signal are attenuated 1030 to generate a multitude of weighted and delayed signals. The multitude of weighted, delayed signals are thereafter combined 1040 to reconstruct a signal representative of the self-interference signal. The reconstructed signal is subsequently subtracted from the received signal to cancel or reduce the self-interference signal at the receiver.

Figure 11:
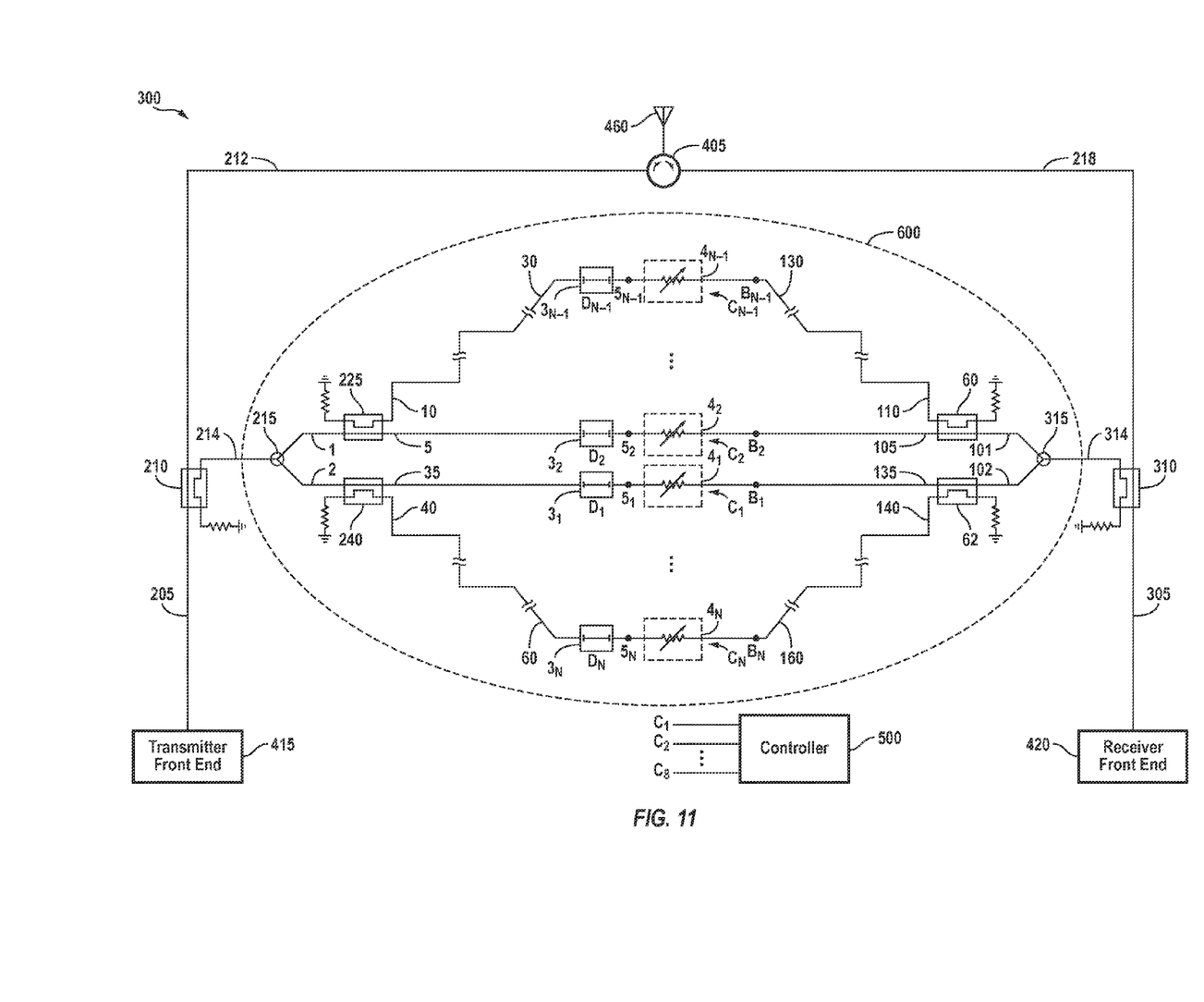
FIG. 11 is a simplified block diagram of a full-duplex wireless communication system, in accordance with one embodiment of the present invention.

FIG. 11 is a simplified block diagram of a full-duplex wireless communication device 600, in accordance with one exemplary embodiment of the present invention. Device 600 is shown as including, in part, a transmitter front end 415, a receiver front end 420, a transmit/receive antenna 460, a circulator 405, and a self-interference cancellation circuit 650. Self-cancellation circuit 600 is similar to self-cancellation circuit 450 except that self-cancellation circuit 600 includes two center taps $5_1, 5_2$, a multitude feedback taps, (N−2) additional feedforward taps, where N is an integer greater than or equal to 3, where each of the additional taps is either in phase with the two center taps, or is out-of-phase with respect to the center taps. For example, although not shown in detail for simplicity, signal paths 30 and 130 are feedback paths formed using the isolation ports of a pair of couplers disposed in self-cancellation circuit 600 in the same manner as shown in FIG. 3. In one embodiment, each of the additional taps is 180° out-of-phase relative to the two center taps. In yet other embodiments, a self-cancellation circuit includes only the two center taps, namely the two center taps $5_1, 5_2$ of FIG. 11, and thus does not include any additional taps.

Figure 12:
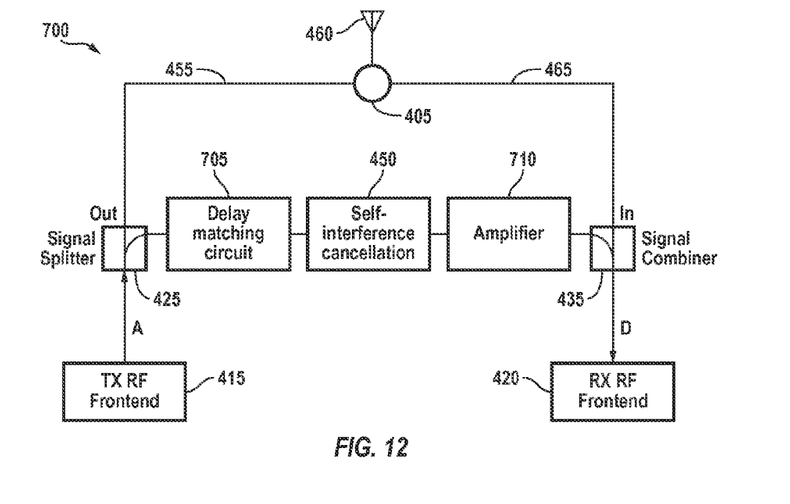
FIG. 12 is a simplified block diagram of a full-duplex wireless communication system, in accordance with one embodiment of the present invention.

FIG. 12 is a simplified block diagram of a full-duplex wireless communication device 700, in accordance with one exemplary embodiment of the present invention. Device 700 is similar to device 200 shown in FIG. 2 except that device 700 also includes a delay matching circuit 705 and an amplifier 710. Delay matching circuit 705 is adapted to account for relatively large delay variations that may be caused by temperature variation or environmental change near the antenna. Accordingly, delay matching circuit 705 is adapted to ensure that the signal received at signal combiner 435 falls within the time windows defined to reconstruct the self-interference signal. Amplifier 710 is adapted to amplify the reconstructed self-interference signal and compensate for power loss that occurs through the self-interference cancellation circuit 450. Although delay matching circuit 705 is shown as being disposed between self-interference cancellation circuit 450 and signal splitter 425, it is understood that in other embodiments, delay matching circuit 705 may be disposed between self-interference cancellation circuit 450 and signal combiner 435. Likewise, although amplifier 710 is shown as being disposed between self-interference cancellation circuit 450 and signal combiner 435, it is understood that in other embodiments, amplifier 710 may be disposed between self-interference cancellation circuit 450 and signal splitter 425.

Figure 13:
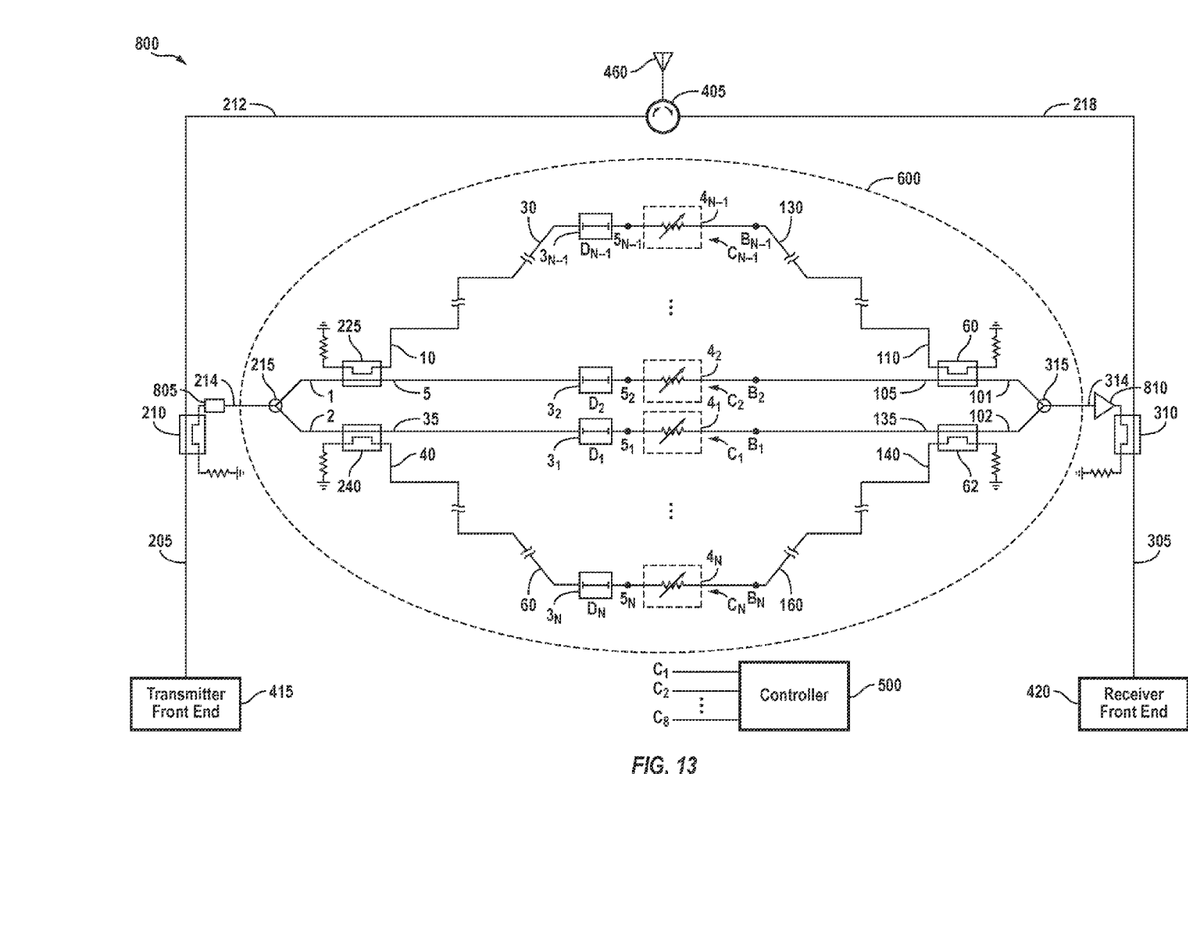
FIG. 13 is a simplified block diagram of a full-duplex wireless communication system, in accordance with one embodiment of the present invention.

FIG. 13 is a simplified block diagram of a full-duplex wireless communication device 800, in accordance with one exemplary embodiment of the present invention. Device 800 is similar to device 600 shown in FIG. 11 except that device 800 also includes a delay matching circuit 805 and an amplifier 810. Delay matching circuit 805 is adapted to account for relatively larger delay variations that may be caused by temperature variation or environmental change near the antenna. Accordingly, delay matching circuit 705 is adapted to ensure that the signal received at coupler 310 falls within the time windows defined to reconstruct the self-interference signal, as shown for example with reference to FIG. 4. Amplifier 810 is adapted to amplify the reconstructed self-interference signal and compensate for power loss that occurs through the self-interference cancellation circuit 650. Although delay matching circuit 805 is shown as being disposed between self-interference cancellation circuit 600 and coupler 210, it is understood that in other embodiments, delay matching circuit 805 may be disposed between self-interference cancellation circuit 600 and coupler 310. Likewise, although amplifier 810 is shown as being disposed between self-interference cancellation circuit 600 and coupler 310, it is understood that in other embodiments, amplifier 810 may be disposed between self-interference cancellation circuit 600 and coupler 210. Furthermore, although not shown, in yet other embodiments, each of one or more of the signal paths in self-interference cancellation circuit 600 may include an amplifier.

The above embodiments of the present invention are illustrative and not limitative. Embodiments of the present invention are not limited by the number of taps used in the signal cancellation circuit. Embodiments of the present invention are not limited by the type of delay element, attenuator, passive coupler, splitter, combiner, amplifier, or the like, used in the cancellation circuit. Embodiments of the present invention are not limited by the number of antennas used in a full-duplex wireless communication device. Embodiments of the present invention are not limited by the frequency of transmission or reception of the signal. Embodiment of the present invention are not limited by the type or number of substrates, semiconductor or otherwise, used to from a full-duplex wireless communication device. Other additions, subtractions or modifications are obvious in view of the present disclosure and are intended to fall within the scope of the appended claims.

What is claimed is:

1. A circuit comprising:
   a first signal path comprising a passive coupler, a delay element and a variable attenuator;
   a second signal path comprising a passive coupler, a delay element and a variable attenuator, said second signal path being substantially in phase with the first signal path;
   first P signal paths each being substantially in phase with the first and second signal paths, each of the first P signal paths comprising a delay element and a variable attenuator, each of (P−1) of the first P signal paths comprising a passive coupler, wherein P is an integer equal to or greater than 1;
   second M signal paths each being out-of-phase relative to the first and second signal paths, each of the second M signal paths comprising a delay element and a variable attenuator, each of (M−1) of the second M signal paths comprising a passive coupler, wherein M is an integer equal to or greater than 1, and wherein a sum of M and P is an integer equal to or greater than two;
   at least a first feedback path formed using an isolation port of the passive coupler disposed in the first signal path or an isolation port of a passive coupler disposed in a first one of the first P signal paths; said at least first feedback path comprising a delay element and a variable attenuator; and
   at least a second feedback path formed via an isolation port of the passive coupler disposed in the second signal path or an isolation port of a passive coupler disposed in a first one of the second M signal paths; said at least second feedback path comprising a delay element and a variable attenuator.

2. The circuit of claim 1 further comprising:
   at least one antenna for receiving or transmitting a signal.

3. The circuit of claim 2 wherein each of the first signal path, the second signal path, the first P signal paths and the second M signal paths is adapted to receive a sample of a transmit signal and generate a delayed and weighted sample of the transmit signal.

4. The circuit of claim 3 further comprising:
   a control circuit configured to vary an attenuation level of the variable attenuators disposed in the first signal path, the second signal path, the first P signal paths and the second M signal paths;
   a combiner adapted to combine the delayed and weighted samples of the transmit signal to generate a first signal representative of a self-interference signal; and
   a combiner/coupler adapted to subtract the first signal from a received signal.

5. The circuit of claim 4 wherein the delay element disposed in the first signal path generates a delay shorter than an arrival time of a second sample of the transmit signal at the combiner/coupler, and wherein the delay element disposed in the second signal path generates a delay longer than the arrival time of the second sample of the transmit signal at the combiner/coupler.

6. The circuit of claim 5 wherein the first signal path, the second signal path, the first P signal paths and the second M signal paths form P/2+M/2+1 associated pairs of paths, the delays generated by the delay elements of each associated pair of delay paths forming a window within which the second sample of the transmit signal arrives at the combiner/coupler.

7. The circuit of claim 6 wherein the control circuit is configured to determine the attenuation levels of the variable attenuators in accordance with values of intersections of an estimate of the self-interference signal and P+M+2 sine functions centered at boundaries of the P/2+M/2+1 windows.

8. The circuit of claim 7 wherein a peak value of at least a subset of the P+M+2 sine functions is set substantially equal to an amplitude of the estimate of the self-interference signal.

9. The circuit of claim 8 wherein said circuit further comprises:
   a splitter adapted to generate the sample of the transmit signal from the transmit signal.

10. The circuit of claim 9 further comprising:
    an isolator having a first port coupled to the antenna, a second port coupled to a transmit line of the circuit, and a third port coupled to a receive line of the circuit.

11. The circuit of claim 10 wherein said isolator is a circulator.

12. The circuit of claim 1 wherein the second M signal paths are substantially 180° of-phase relative to the first and second signal paths.

13. The circuit of claim 1 further comprising a variable delay element.

14. The circuit of claim 1 further comprising at least one amplifier.

15. A method of reducing a self-interference signal, the method comprising:
    delivering a first portion of a first sample of a transmit signal to a first passive coupler to generate a first through signal;

generating a first signal defined by a delayed and weighted sample of the first through signal;
delivering a second portion of the sample of the transmit signal to a second passive coupler to generate a second through signal;
generating a second signal defined by a delayed and weighted sample of the second through signal;
generating P signals each being substantially in phase with the first and second signals and each defined by a different delayed and weighted sample of either the first or the second through signals, wherein at least one of the P signals is a feedback signal;
generating M signals each being substantially out-of-phase relative to the first and second signals and each defined by a different delayed and weighted sample of either the first or the second through signals, wherein at least one of the M signals is a feedback signal; and
combining the first signal, the second signal, the first P signals and the second M signals to generate a combined signal representative of the self-interference signal.

16. The method of claim 15 further comprising:
receiving a second sample of the transmit signal via an antenna;
combining/coupling the combined signal with the second sample of the transmit signal received via the antenna.

17. The method of claim 16 further comprising:
setting the delay of the first signal to a value less than an arrival time of the second sample of transmit signal at the antenna; and
setting the delay of the second signal to a value greater than the arrival time of the second sample of the transmit signal at the antenna.

18. The method of claim 17 further comprising:
forming P/2+M/2+1 associated time windows defined by the delays of the first signal, the second signal, the P signals, and the M signals; and
selecting the delays of the first signal, the second signal, the P signals, and the M signals such that the arrival time of the second sample of the transmit signal at the antenna falls within each of the P/2+M/2+1 time windows.

19. The method of claim 18 further comprising:
determining weights of the first and second though signals in accordance with values of intersections of an estimate of the self-interference signal and P+M+2 sinc functions centered at boundaries of the P/2+M/2+1 time windows.

20. The method of claim 19 further comprising:
setting a peak value of at least a subset of the P+M+2 sinc functions substantially equal to an amplitude of the estimate of the self-interference signal.

21. The method of claim 20 further comprising:
receiving the first sample of the transmit signal from a splitter.

22. The method of claim 21 further comprising:
delivering a second portion of the transmit signal to an isolator;
delivering the transmit signal from the isolator to the antenna.

23. The method of claim 22 wherein said isolator is a circulator.

24. The method of claim 15 further comprising:
generating the M signals such that each of the M signals is substantially 180° out-of-phase relative to the first and second signals.

25. The method of claim 15 further comprising:
delaying the first sample of the transmit signal.

26. The method of claim 15 further comprising:
amplifying the first sample of the transmit signal.

27. The method of claim 15 further comprising:
amplifying the combined signal.

28. The method of claim 15 further comprising:
amplifying at least one of the first signal or the second signal.

29. The method of claim 15 further comprising:
amplifying at least one of the M signals.

30. The method of claim 29 further comprising:
amplifying at least one of the P signals.

* * * * *

UNITED STATES PATENT AND TRADEMARK OFFICE
CERTIFICATE OF CORRECTION

PATENT NO.        : 9,490,963 B2
APPLICATION NO.   : 14/172805
DATED             : November 8, 2016
INVENTOR(S)       : Jung-il Choi et al.

Page 1 of 1

It is certified that error appears in the above-identified patent and that said Letters Patent is hereby corrected as shown below:

In the Claims

In Column 14, Line 39, "sine" should read "sinc"
In Column 14, Line 43, "sine" should read "sinc"

Signed and Sealed this
Twenty-eighth Day of February, 2017

Michelle K. Lee
*Director of the United States Patent and Trademark Office*